Patented Dec. 21, 1937

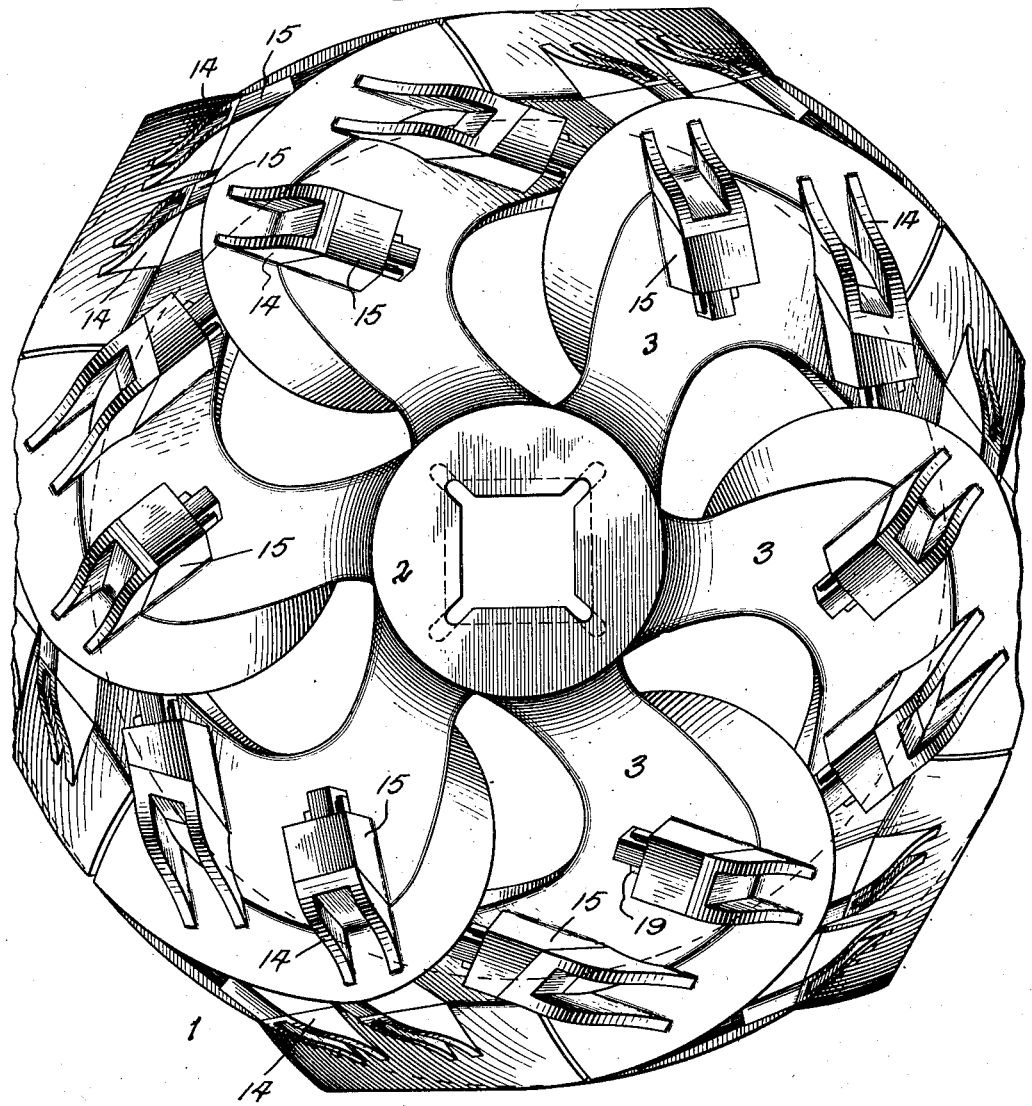

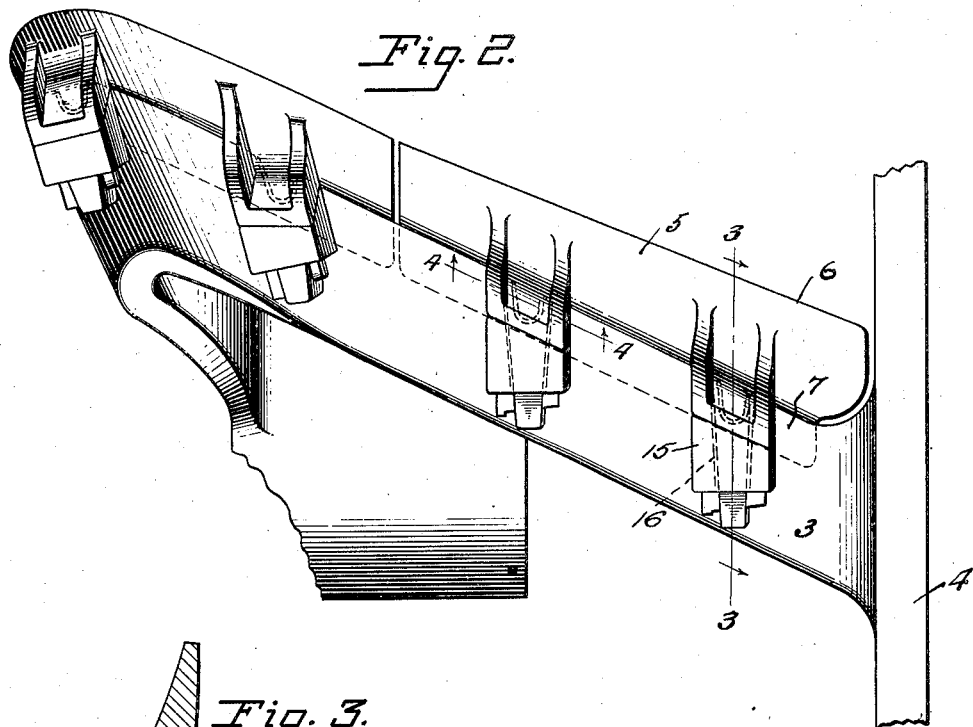

2,103,124

UNITED STATES PATENT OFFICE 2,103,124

CUTTER HEAD FOR SUCTION DREDGES

William H. Stires, High Bridge, N. J., assignor to Taylor-Wharton Iron & Steel Company, High Bridge, N. J., a corporation of New Jersey Application August 3, 1934, Serial No. 738,364

1 Claim. (Cl. 37—67)

The invention is an improvement in cutter heads for use with suction dredges.

Heretofore it has been proposed to equip such devices with replaceable blades and such an expedient is decidedly meritorious but in all such prior constructions, with which I am familiar, the blades are bolted or riveted to the head and much time is required in the operations of removal and replacement and all the while the dredger is idle. The matter of time is of the very essence of the problem for it may be so serious as completely to negative the economy naturally inherent to the replaceable expedient, and so it is particularly important that the connection be such that, without loss of rigidity, it shall provide for the removal and replacement of the blades with a minimum expenditure of time and labor. And that is the primary object of the invention.

The nature, characteristic features, and scope of the invention more readily will be understood from the following detailed description taken in connection with the accompanying drawings, forming a part hereof, wherein Figure 1 is a bottom plan view of the improved cutter head.

Fig. 2 is a broken elevation of an arm of the cutter head showing a plurality of blades applied thereto in accordance with the invention.

Fig. 3 is an enlarged section on line 3—3 of Fig. 2.

Fig. 4 is an enlarged section on line 4—4 of Fig. 2.

The cutter head 1 is of more or less conventional type involving a hub 2 adapted to be mounted in the conventional way with relation to the nozzle of a suction dredger. Arms 3 radiate from the hub to an edge or bounding ring 4 forming the outer limit of the head.

Blades 5 are designed to be removably secured to the arms 3 and extend below the same for the proper cutting or agitating operation incidental to the rotation of the head. They include appropriately formed cutting edges 6 extending throughout one longitudinal edge of the blade, the opposite edge portion of the blade being formed as a skirt 7 designed to rest against one side of the arm when the blade is applied.

At appropriate points throughout their length and within the respective skirted areas, the blades are provided with lateral projections 8, and the arms 3 are formed with correspondingly shaped recesses 9 into which the projections are fitted. In transverse section the contour of the projections and recesses is such as to serve to interlock the blades against movement in a direction toward that surface of the arm with which the skirt engages.

For this purpose, as shown more particularly in Fig. 4, the projections 8 immediately adjacent the skirt are relatively narrow, as at 10, and then increase in width, as at 11, towards the free faces of the projections. Since the blades are applied from above it will be apparent that when a projection 8 is fitted within a recess 9, the skirt prevents movement of the blade relative to the arm in one direction while the enlarged portion 11 of the projection 8 prevents similar movement of the blade in the opposite direction.

Depending from the blade on the side opposite the skirt 7 is a shank 12. It is formed as an integral projection of the blade and depends from an enlargement 13 which is adequately reinforced by spaced integral walls 14 which extend downwardly of the blade and terminate short of the cutting edge.

Arms 3 are provided with sockets 15 which provide a downwardly converging passage 16. The shank 12 is formed accurately to fit this passage and the lower end of the socket presents an abrupt bearing wall 17 which is spaced below the upper edge of the arm and constitutes an abutment for a taper pin or wedge 19 accommodated in a passage 18 ranging transversely of the shank. Under such construction and arrangement the blade can be drawn down to compel its projection 8 to seat accurately in the recess 9 and the upper portion of the enlargement 13 to bear squarely upon the upper end of the socket 15.

The extreme lower edge of the outer wall of the socket 15 is preferably upwardly beveled, as at 20, and the overlying portion of the enlargement 13 is correspondingly shaped at 21, so that as the shank is drawn through the socket by the pin 19 there is a more or less wedging interfit between the surfaces 20 and 21 which serve as a further interlock between the blade and arm. If desired, and as preferred, the pin 19 may be formed as a cotter or made up of two sections secured together at one end, with the pin of sufficient length to project through the shank when driven into place, to permit the ends of the pin to be spread against accidental separation.

Manifestly, the blade for each arm may be provided as a single element or as a number of elements, two such being illustrated in Fig. 2, and that each blade so provided will preferably be formed to duplicate the securing means described, that is, the projections 8 and the shanks 12, although it is to be understood that any desired number of such securing means may be employed in order that the blade may be rigidly secured to the arm in use.

In the use of cutter heads with suction dredgers, it is frequently necessary to change the type of blade during a single operation of the dredger, by reason of the fact that soils of different character are encountered, under which circumstances a particular type of blade is required. Furthermore, the blades become worn in use and possibly broken and, in order for effective operation of the dredger, such blades, when required, must be removed and replaced.

Through the use of the present construction, such removal and replacement of the blades is a matter involving minimum loss of time and labor, since all that is necessary is to drive out the locking pin or pins 19 and simply lift the blade from its cooperation with the arm. To replace the blade, it is merely applied to interfit its projection or projections 8 with the corresponding recesses 9 in the arm, during which application the shank 12 is passed through the socket 15. The locking pins are then applied, being driven with sufficient force to draw all locking parts of the blade and arm into contact and interfitting as well as interlocking relation and thereby completing the operation.

The blade, when applied, is in effect a rigid, unitary part of the arm, for the skirt 7 prevents relative lateral movement of the arm of the blade in one direction while the interlocking projection and recess prevents relative lateral movement of the blade in the opposite direction, this latter movement being materially reinforced, of course, by the bearing of the shank 9 against that portion of the arm constituting the inner wall of the socket 15. As the shank 12 and opening in the socket are upwardly convergent, the driving of the locking pin 19 in place draws the shank down into the socket for a wedging interfit, thus not only reinforcing the blade against any possible lateral movement, but, at the same time, rigidly securing it against longitudinal movement. With the provision of at least two securing means on each blade, any possibility of tilting the blade in use is absolutely prevented.

The construction entirely avoids the use of bolts or rivets which, while admittedly presenting a more or less rigid construction, are difficult to separate when replacement of the blade is necessary and entail unnecessary loss of time and labor, to say nothing of the time and labor required to replace such types of connection. With the present type of connection the effective rigidity of the blade on the arm and the practical impossibility of the separation of the blade and arm short of the actual breakage of the connecting parts, while at the same time permitting a simple and expeditious disconnection or re-connection of the blade to the arm, presents a construction which is of particular importance in cutter heads of this type in reducing to a minimum the time and labor required in the removal and replacement of the blades.

Of course, the invention, while designed more particularly for cutter heads of suction dredgers, is equally applicable for other uses and is so intended.

Having described the invention, what is claimed, is:

In a cutter head for suction dredges, the combination comprising a spider having a hub and a ring integrally joined by arms, and cutting blades detachably mounted on the arms and applied as aligned separable segments in edge contour fitting relation to the leading edges of the arms, the segments having paired lateral projections, and the arms having complemental recesses to establish an edge lock, said projections being continued as offset abutments with reversely ranging webs and shanks, and complemental offsets or abutments on the arms and having slots to accommodate the shanks, and means for tightening the segments by relatively securing the abutments.

WILLIAM H. STIRES.